Aug. 16, 1927.

H. F. RICHARDSON

ELECTRICAL CONNECTING UNIT

Filed Jan. 7, 1922

1,639,310

Inventor
Henry F. Richardson
by Prindle, Wright & Small
Attorneys

Patented Aug. 16, 1927.

1,639,310

UNITED STATES PATENT OFFICE.

HENRY F. RICHARDSON, OF BROOKLYN, NEW YORK, ASSIGNOR TO EMMA LOUISE AUTH, OF BROOKLYN, NEW YORK.

ELECTRICAL CONNECTING UNIT.

Application filed January 7, 1922. Serial No. 527,536.

The invention is designed particularly for use in connection with annunciator systems or the like, wherein a large number of conductors, for example, the strands making up the main cable, are desired to be connected respectively to other conductors, such as the branch wires leading to various points from which signals are to be given.

One object is to provide a device of the above character, which will serve to accommodate all of the conductors and group or correlate them properly relative to each other, in such a way as to simplify the operations of making or changing connections, and minimize the liability of errors in connections.

Another object is to reduce as much as possible the amount of space taken up by the structure necessary to provide for the connections between conductors.

Further objects and advantages of the invention will be in part obvious and in part specifically pointed out in the description hereinafter contained, which, taken in connection with the accompanying drawings, discloses a preferred embodiment thereof; such embodiment, however, is to be considered as merely illustrative of its principle.

Figure 1:
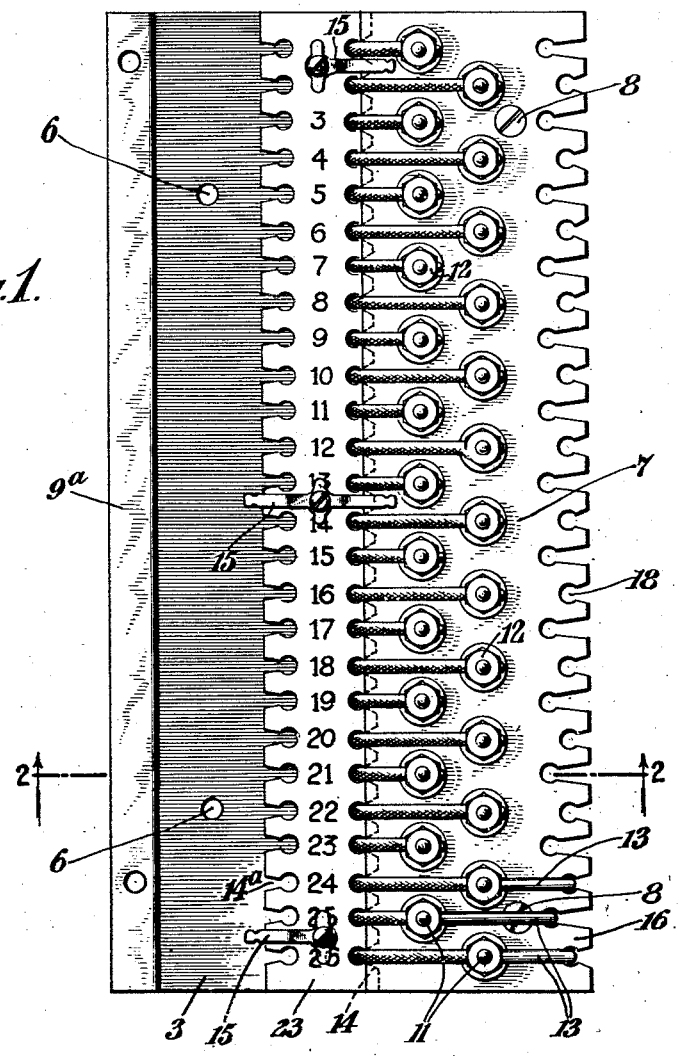
Fig. 1 is a plan view of an electrical connecting unit made in accordance with the invention, with one connection block removed and another connection block shown with a plurality of conductors properly connected thereto.
Figure 2:
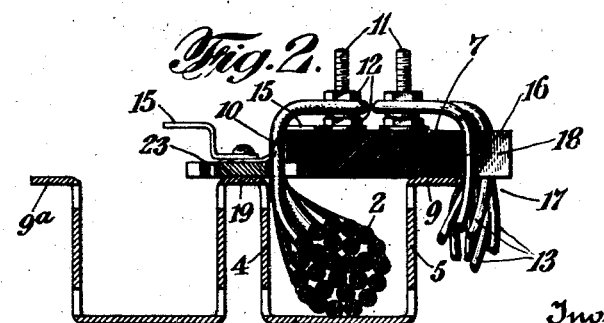
Fig. 2 is a section on line 2—2 of Fig. 1, looking in the direction of the arrows.

When connections are to be made in systems of the character above described, if connecting devices are relied upon which have to be made up more or less specially, or on the job, so to speak, it is necessary to form and lace the cables and secure all conductors in proper position as well as to make the connections carefully, which operations require skilled labor and a large amount of time, as do also the operations of changing connections.

The present invention, when its main features are all employed in combination, provides a unitary device or unit which includes all the component parts necessary for the proper completion of the connections, thus eliminating special constructions for each particular job and simplifying the labor of making the connections, all as will be more apparent in detail as the description proceeds. It should be understood however that certain of the features of the invention are useful independently of the particular elements herein described as associated therewith.

Referring to the drawings, the invention is disclosed as embodying a bottom member 1, shaped to provide a trough extending lengthwise of the unit, in which an electric cable 2 may be received. In the present instance, this bottom member is of sheet-metal, channel-shaped in cross-section, to provide a base 3 adapted to rest upon a panel board, or the like, and sides 4 and 5, respectively, which lie laterally of the cable 2. The bottom member may be secured to a panel board by any suitable means, such as the holes 6 in base 3, through which screws may be passed.

A connection block 7 is suitably mounted on the bottom member 1 in the present instance by means of screws 8, which pass through the connection block and into a flange 9 at the upper edge of side wall 5 of the bottom member. I associate with the inner edge 10 of the base block devices for receiving the strands of cable 2 and guiding such strands respectively into position to engage one of a plurality of terminals 11, mounted on the upper surface of the connection block. The terminals 11 are shown in the form of binding posts mounted in an insulating block 7 and provided with nuts 12 which engage the ends of the strands of cable 2, as well as the ends of a plurality of branch conductors 13, which lead to the various points to which circuit connections are desired to be made.

In the preferred form of the invention, the strands of cable 2 are guided and held in position to engage the proper terminals 11 by means of a form strip 23, which is fixed in position adjacent the upper edge of side wall 4 and overhangs the trough in bottom member 1, the overhanging side of the form strip being provided with a plurality of notches 14. The inner side edge 10 of the connection block overlaps the ends of notches 14 in such manner as to lock the strands of cable 2 in position after the operation of inserting the strands in the proper slots has been completed. The connection block 7 is also removable from its position over the trough containing cable 2, and the first step in making the connections is to remove the connection block after which the strands of cable 2 are inserted into the proper slots 14. Block 7 is then returned to operative position to lock the strands within the slots, and the ends of the strands are then connected, respectively, to the binding posts 11 which are opposite the corresponding slots.

With a structure of the above character, it is not necessary to form or lace the cable since the latter is fully protected and held in proper position within the trough of bottom member 1, while its individual strands are so correlated with the binding posts, to which they are, respectively, to be connected, that there is little liability of the unit becoming disarranged after the connections are once completed.

As shown, a plurality of clips 15 are attached to the form strip 13 and bent to engage over the edge 10 of block 7 to insure that the latter will remain in proper position. Numerals may also be provided on the form strip, as illustrated in Fig. 1, to simplify the making of the desired connections between the cable and the branch conductors.

The outer side edge 16 of connection block 7 preferably projects laterally beyond the bottom member 1 to provide a space 17 underneath such projecting portion adapted to receive the branch electrical conductors 13, and I also prefer to provide guiding devices for such branch wires to assist in leading them to the proper binding post 11.

As shown, slots 18 are provided in the outer side edge of the connecting block, these slots, as well as the binding posts 11, being staggered to cut down the dimensions of the connecting unit as much as possible. The branch wires then may be led into the unit underneath the projecting edge 16 of the connection block and inserted through slots 18, after which they are bound in position under nuts 12 of the terminal posts 11. The walls of slots 14 and 18 preferably taper, as shown in Fig. 1, whereby a certain amount of force is necessary to force the conductors into the walls before they seat against the enlarged inner ends of the same, thus tending to prevent the conductors from slipping out after the connections have been completed.

With a structure of the above character, it is not necessary to make up any special parts to be used in making the connections, and the cable as well as the branch conductors are housed under the connecting unit, which latter also serves to hold them in such relation to each other that the connections may be readily checked over or changed as desired with minimum liability of errors.

In some instances, I prefer to make the bottom member 1 of double-channel cross-section to provide an additional trough extending parallel to the one previously described. With such a structure, the form strip 13 may be provided with additional slots 14ª, similar to slots 14 previously described, but located on the opposite side of the form strip, so as to overhang the additional trough. The form strip will be then mounted upon a rib 19 between the troughs and a further connection block will be secured upon the flange 9ª corresponding to flange 9 previously described. Thus the strands of a large cable may be split up to lie in both of the troughs and both sides of the form strip will be utilized in guiding the strands to the proper binding posts, while the branch conductors may be led out from underneath the projecting side edges of both connection blocks. Such a double unit, as illustrated in Figure 1, would serve for the connections of a 52-strand cable and reduces twice, or even four times, the space necessary to be given up to make the connections.

While a specific embodiment of the invention has been described, it is obvious that many changes may be made without departing from its principle, as defined in the following claims:

I claim:

1. An electrical connecting unit, comprising a bottom member shaped to provide a trough extending lengthwise of the unit, a connection block detachably secured to said bottom member and overlying the open side of said trough, a plurality of conductor attaching terminals spaced along the outer surface of said block, said connection block having a plurality of slots in one side edge adapted to guide electrical conductors into position to engage respectively adjacent terminals.

2. An electrical connecting unit, comprising a bottom member shaped to provide a trough extending lengthwise of the unit, a connection block detachably secured to said bottom member and overlying the open side of said trough, and a plurality of conductor attaching terminals spaced along the outer surface of said block, devices being provided adjacent the overlying side edge of said block, each adapted to guide an electrical conductor into position to engage one of said terminals.

3. An electrical connecting unit, comprising a bottom member shaped to provide a trough extending lengthwise of the unit, a connection block detachably secured to said bottom member and overlying the open side of said trough, and a plurality of conductor attaching terminals spaced along the outer surface of said block, devices being provided adjacent each side edge of said block, each adapted to guide an electrical conductor into position to engage one of said terminals.

4. An electrical connecting unit, comprising a bottom member shaped to provide a trough extending lengthwise of the unit, a connection block detachably secured to said bottom member and overlying the open side of said trough, and a plurality of conductor attaching terminals spaced along the outer surface of said block, devices being provided adjacent each side edge of said block, each adapted to guide an electrical conductor into position to engage one of said terminals, said block projecting laterally beyond said bottom member to provide space under the projecting portion of the block adapted to receive electrical conductors.

5. An electrical connecting unit, comprising a bottom member shaped to provide a trough extending lengthwise of the unit, a connection block detachably secured to said member and overlying the open side of said trough, a plurality of conductor attaching terminals spaced along the outer surface of said block, devices being provided adjacent one side edge of said block, each adapted to guide an electrical conductor into position to engage one of said terminals, and said block being removable from said bottom member to expose the trough in the latter.

6. An electrical connecting unit comprising a bottom member shaped to provide a trough extending lengthwise of the unit, a form strip secured in position adjacent said trough, said form strip being provided with devices spaced along the trough each adapted to guide an electrical conductor, a connection block mounted upon said bottom member and overlying the open side of said trough and a plurality of conductor attaching terminals spaced along the outer surface of said block and respectively positioned adjacent the conductor guiding devices on the form strip.

7. An electrical connection unit comprising a bottom member shaped to provide a trough extending lengthwise of the unit, a form strip secured in position adjacent said trough, said form strip being provided with devices spaced along the trough each adapted to guide an electrical conductor, a connection block mounted upon said bottom member, and a plurality of terminals spaced along the outer surface of said block and respectively positioned adjacent the conductor guiding devices on the form strip, said block being removable from said bottom member to expose the trough in the latter, and being provided with structure adapted to lock conductors in their guiding devices when the block is in operative position.

8. An electrical connecting unit comprising a bottom member shaped to provide a trough extending lengthwise of the unit, a form strip secured to said bottom member with a side overhanging the trough, said overhanging side being provided with guiding notches for conductors to be contained within the trough, and a connection block mounted on said bottom member to cover the trough, a plurality of terminals spaced along the outer surface of said block and located respectively opposite the notches in the form strip, the adjacent edge of said block overlapping the notches to close the same, said block being removable from operative position to expose the trough.

9. An electrical connecting unit comprising a bottom member shaped to provide a trough extending lengthwise of the unit, a form strip secured to said bottom member with a side overhanging the trough, said overhanging side being provided with guiding notches for conductors to be contained within the trough, and a connection block mounted on said bottom member to cover the trough, a plurality of terminals spaced along the outer surface of said block and located respectively opposite the notches in the form strip, the adjacent edge of said block overlapping the notches to close the same, said block being removable from operative position to expose the trough and projecting laterally beyond said bottom member to provide space under the projecting portion of the block adapted to receive electrical conductors, and the projecting edge of said block being provided with conductor guiding notches located respectively opposite the terminals.

10. An electrical connecting unit comprising a bottom member of double-channel cross-section to provide parallel troughs extending lengthwise of the unit, a form strip mounted on the rib of said member between the trough, the sides of said form strip overhanging the troughs and each being provided with guiding notches for conductors to be contained within the troughs, and connecting blocks mounted on the outer sides of said member to cover the troughs, said connection blocks overlapping the notches to close the same, and having terminals located respectively opposite the notches in the form strip, said blocks being removable to expose the troughs.

11. An electrical connecting unit comprising a bottom member of double-channel cross-section to provide parallel troughs extending lengthwise of the unit, a form strip mounted on the rib of said member between the trough, the sides of said form strip overhanging the troughs and each being provided with guiding notches for conductors to be contained within the troughs, and connection blocks mounted on the outer sides of said member to cover the troughs, said connection blocks overlapping the notches to close the same, and having terminals located respectively opposite the notches in the form strip, said blocks being removable to expose the troughs and extending laterally beyond the bottom member to provide spaces under the projecting portions adapted to receive electrical conductors and such projecting portions being provided with conductor guiding notches located respectively opposite the terminals.

12. An electrical connecting unit comprising a bottom member shaped to provide a trough extending lengthwise of the unit, a connection block detachably mounted over the open side of said trough, a series of conductor attaching terminals spaced lengthwise along the exposed side of said connection block, said connecting unit including conductor receiving slots near one side edge of the trough and respectively adjacent the several terminals to permit conductors to be led from the trough through the slots to the terminals.

In testimony that I claim the foregoing, I have hereunto set my hand this 28th day of December, 1921.

HENRY F. RICHARDSON.